US012292073B1

(12) United States Patent
Kemeny

(10) Patent No.: US 12,292,073 B1
(45) Date of Patent: May 6, 2025

(54) BOLT TENSIONER AND FASTENER ASSEMBLIES

(71) Applicant: Zoltan A. Kemeny, Chandler, AZ (US)

(72) Inventor: Zoltan A. Kemeny, Chandler, AZ (US)

( * ) Notice: Subject to any disclaimer, the term of this patent is extended or adjusted under 35 U.S.C. 154(b) by 0 days.

(21) Appl. No.: 19/004,364

(22) Filed: Dec. 29, 2024

(51) Int. Cl.
*F16B 31/04* (2006.01)
*B25B 29/02* (2006.01)

(52) U.S. Cl.
CPC .............. *F16B 31/04* (2013.01); *B25B 29/02* (2013.01)

(58) Field of Classification Search
CPC .................................. F16B 31/04; B25B 29/02
USPC ................................ 411/14.5, 916, 917, 432
See application file for complete search history.

(56) References Cited

U.S. PATENT DOCUMENTS

| | | | | | |
|---|---|---|---|---|---|
| 2,571,265 | A * | 10/1951 | Leufven | ................ | F01D 25/243 411/917 |
| 2,760,393 | A * | 8/1956 | Stough | .................... | B25B 29/02 73/761 |
| 3,749,362 | A * | 7/1973 | O'Connor | ............. | B23P 19/068 411/537 |
| 4,249,718 | A * | 2/1981 | Heaton | ................ | F15B 15/1447 254/29 A |
| 4,535,656 | A * | 8/1985 | Orban | .................... | B23P 19/067 376/262 |
| 4,844,418 | A * | 7/1989 | Cole | ....................... | B25B 29/02 81/57.38 |
| 5,075,950 | A * | 12/1991 | Steinbock | ............... | B25B 29/02 29/446 |
| 5,137,408 | A * | 8/1992 | Junkers | .................... | F16B 31/04 411/222 |
| 5,152,649 | A * | 10/1992 | Popp | ....................... | F16B 31/04 29/256 |
| 5,772,378 | A * | 6/1998 | Keto-Tokoi | ............. | B25B 29/02 411/917 |
| 9,321,161 | B2 * | 4/2016 | Ceney | ..................... | B25B 13/06 |
| 11,897,102 | B2 * | 2/2024 | Evans | ..................... | B25B 29/02 |

* cited by examiner

*Primary Examiner* — Flemming Saether

(74) *Attorney, Agent, or Firm* — Parsons & Goltry, PLLC; Michael W. Goltry; Robert A. Parsons

(57) ABSTRACT

A fastener assembly includes a threaded shank having a first end and a second end, a securing nut, a loading nut, and a tensioning nut including a surface engaging portion. The securing nut and the loading nut are threaded on the threaded shank. The securing nut is between the loading nut and the second end. The loading nut is between the securing nut and the first end. The securing nut and the loading nut are tightenable against each other. The tensioning nut is threaded on the loading nut with the surface engaging section spaced radially outboard of the securing nut.

16 Claims, 10 Drawing Sheets

BOLT TENSIONER AND FASTENER ASSEMBLIES

FIELD OF THE INVENTION

The present invention relates to fastener assemblies and bolt tensioners.

DESCRIPTION OF RELATED ART

In many manufactured products, it is essential to join two or more elements or surfaces together. Bolted joints are useful for this when the elements require periodic disassembly and assembly without destroying the joint.

Bolted joints include fasteners that capture and join other parts and are secured by mating screw threads. A bolted joint is either a soft joint or a hard joint. A soft-bolted joint is when the hardness of at least one of the elements is below 30 RC. A hard-bolted joint is when the hardness of all the elements is greater than 30 RC. A bolted joint may use a through-hole or a tapped hole. A through-hole or stud joint relies on parts joined together using a stud. A tapped hole or screw joint relies on parts joined together using a threaded hole and a threaded fastener.

The objective of a bolted joint is to maintain joint cohesiveness, whether a tension joint or a shear joint. The axial forces exerted by the parts of a tension joint try to separate the joint. Accordingly, the bolt of a tension joint must serve as a clamp to hold the parts together. The shear forces exerted by the elements of a shear joint try to separate the joint. Accordingly, the bolt of a shear joint must serve as a pin to keep the parts stationary.

A standard bolt is a longitudinally straight shank including a first end, a second end, a head proximate to the first end, and an external thread. The external thread between the first and second ends is configured to thread on an internal thread of a tapped nut, through-hole, or blind hole. A standard bolted joint includes the internal thread exerting an axial clamping force and the bolt's shank acting as a dowel, pinning the joint against lateral shear forces. The locking method of the bolted joint includes the internal thread of the nut, opening, or blind bore on the external thread of the bolt. Rotational engagement of the internal thread over and on the external thread creates axial clamping.

Vibration and prevailing torque capable of inducing relative movement between bolted structures can loosen bolted joints by unwinding the bolt's external thread from the applied internal thread. While skilled artisans have developed locknuts, jam nuts, lock washers, cumbersome, heavy, expensive, difficult to use, and inherently complex multi-jackboot tensioners, and thread-locking fluid to resist loosening, existing methods are not entirely satisfactory, unreliable, and, in many implementations, impracticable, necessitating continued improvement in the art.

SUMMARY OF THE INVENTION

According to the invention, a fastener assembly includes a threaded shank having a first end and a second end, a securing nut, a loading nut, and a tensioning nut including a surface engaging portion. The securing nut and the loading nut are threaded on the threaded shank. The securing nut is between the loading nut and the second end. The loading nut is between the securing nut and the first end. The securing nut and the loading nut are tightenable against each other. The tensioning nut is threaded on the loading nut with the surface engaging section spaced radially outboard of the securing nut.

The surface engaging section includes roller bearings projecting outward toward the second end to support loads. The roller bearings are spaced apart circumferentially. The surface engaging section further includes blocks. The blocks are configured with the rotating roller bearings that extend outward beyond the blocks toward the second end. The blocks are spaced apart circumferentially and aligned axially.

The securing nut includes an inner end, an outer end, and a hole extending through the securing nut from the inner end to the outer end, the hole of the securing nut including an internal thread threaded on the threaded shank. The loading nut includes an inner end, an outer end, and a hole extending through the loading nut from inner end of the loading nut to the outer end of the loading nut, the hole of the loading nut including an internal thread threaded on the threaded shank. The outer end of the securing nut opposes the inner end of the loading nut, wherein the outer end of the securing nut and the inner end of the loading nut are tightenable against each other. The loading nut further includes a head, and an external thread. The head of the loading nut is between the external thread and the outer end of the loading nut. The external thread is between the head and the inner end of the loading nut. The tensioning nut includes an outer end, a hole extending through the tensioning nut from the outer end of the tensioning nut to the surface engaging section, and a head, the hole of the tensioning nut including an internal thread threaded on the external thread of the loading nut and the head of the tensioning nut between the outer end of the tensioning nut and the surface engaging section.

The securing nut is engageable by a tool inserted through the tensioning nut for rotating the securing nut about the threaded shank. The tensioning nut is configured with a space, opening, or gap that is open to the securing nut, the securing nut engageable by the tool inserted through the gap. The securing nut has a cavity that is open outward to the gap, the securing nut engageable by the tool by inserting it through the gap and into the cavity. The gap is between the blocks.

The loading nut is engageable by a tool inserted through the tensioning nut for rotating the loading nut about the threaded shank. In an exemplary embodiment, the head of the loading nut is engageable by the tool inserted through the outer end of the tensioning nut.

In a particular embodiment, a washer is coupled magnetically to the roller bearings.

BRIEF DESCRIPTION OF THE DRAWINGS

Specific objects and advantages of the invention will become readily apparent to those skilled in the art from the following detailed description of illustrative embodiments thereof, taken in conjunction with the drawings in which.

DETAILED DESCRIPTION

Figure 1:
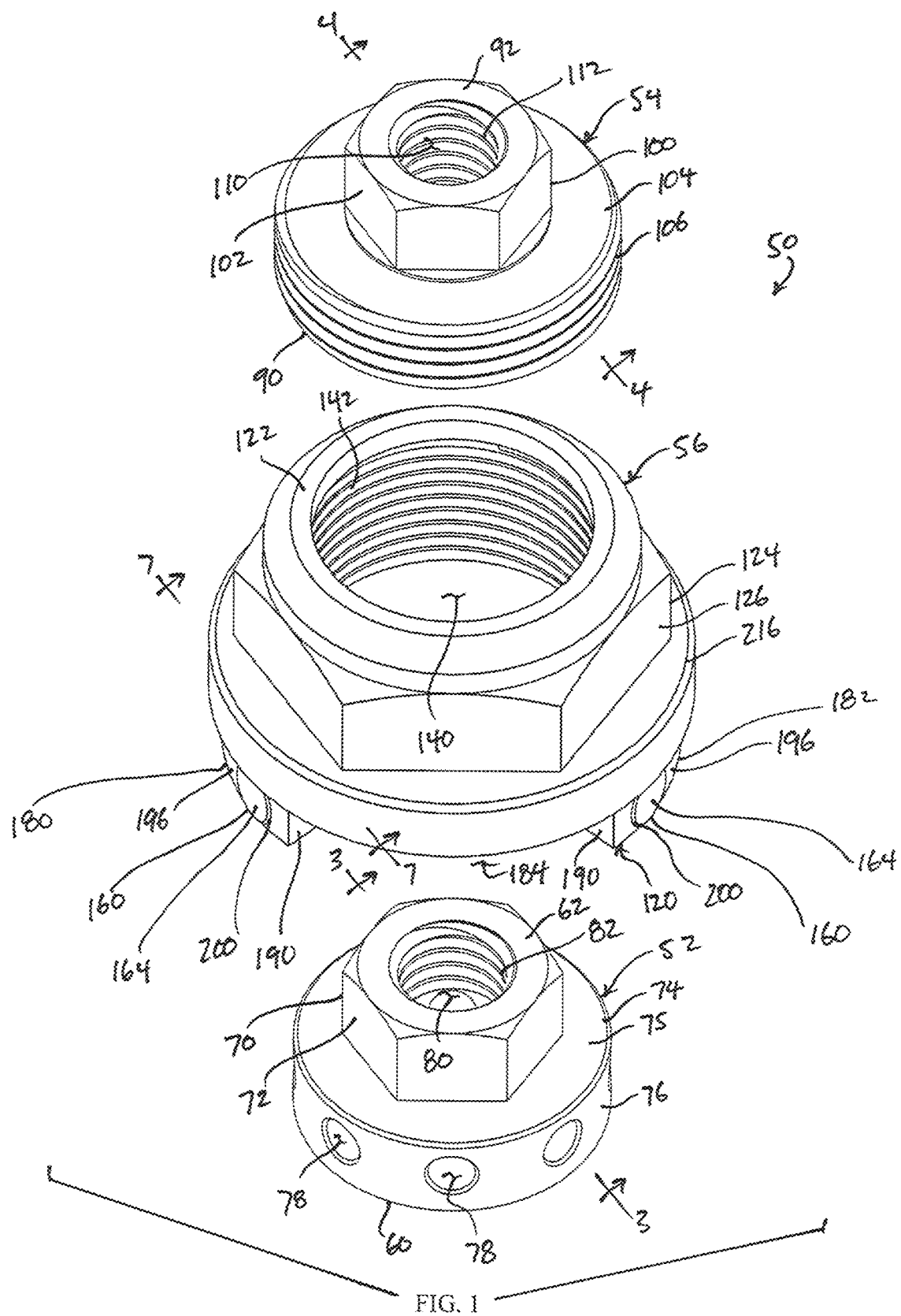
FIG. 1 is a top exploded perspective view of a bolt tensioner assembly constructed and arranged according to the principle of the invention, the bolt tensioner assembly including a securing nut, a loading nut, and a tensioning nut.
Figure 2:
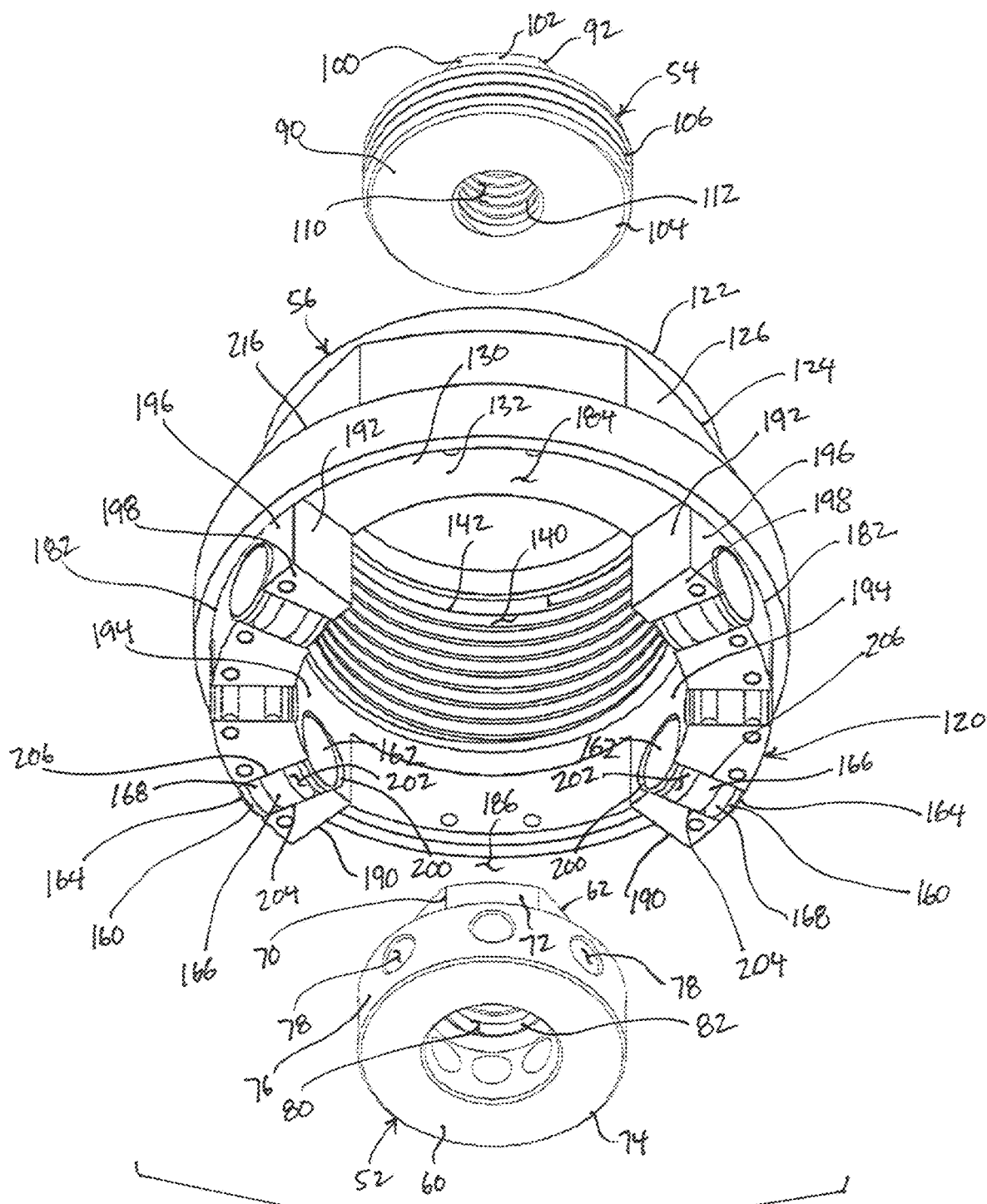
FIG. 2 is a bottom perspective view of the embodiment of FIG. 1.

Turning now to the drawings, in which like reference characters indicating corresponding elements throughout the several views, attention is first directed to FIGS. 1 and 2 illustrating top and bottom exploded perspective views, respectively, of a bolt tensioner assembly 50 constructed and arranged according to the principle of the invention. The bolt tensioner assembly 50 includes a securing nut 52, a loading nut 54, and a tensioning nut 56 with a load-bearing surface engaging portion denoted at 120. The securing nut 52 and the loading nut 54 are to thread on a bolt's threaded shank with the securing nut 52 between the loading nut and a distal end of the threaded shank, the loading nut 54 between the securing nut 52 and a proximal end of the threaded shank, and the securing nut 52 and the loading nut 54 tightenable against each other, and the tensioning nut 56 is configured to thread on the loading nut 54 with the surface engaging section 120 spaced radially outboard of the securing nut 52 to support loads.

Figure 3:
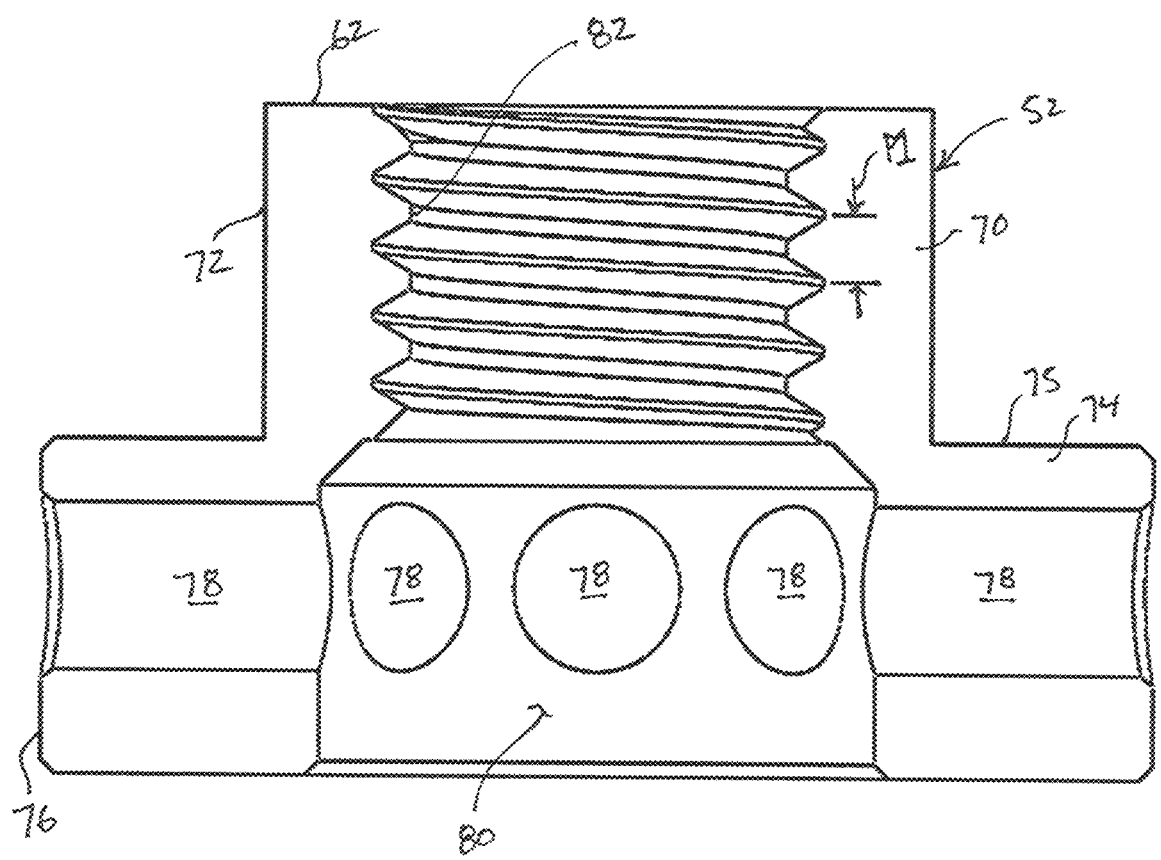
FIG. 3 is a section view taken along line 3-3 of FIG. 1.

Referring to FIGS. 1 and 2, relevantly, and FIG. 3, a section view taken along line 3-3 of FIG. 1, the securing nut 52, an annular block or body, includes an inner end 60, an outer end 62, a head 70, a flange 74 having an outer radial surface 75, and a hole 80. The inner end 60 and the outer end 62 are radial bearing surfaces. The inner end 60 is the securing nut's 52 inner radial bearing surface. The outer end 62 is the securing nut's 52 outer radial bearing surface. The hole 80 extends through securing nut 52 from inner end 60 to the outer end 62, the inner end 60 and the outer end 62 each open to the hole 80 configured with an internal thread 82 having a pitch P1, the distance between adjacent peaks or crests of the internal thread 82. The hole 80 is internally threaded by the internal thread 82 that extends between the outer end 62 and the flange 74 and is configured to thread on a threaded shank. The outer end 62 is tightenable against the loading nut 54 in FIGS. 1 and 2. The head 70 extends outward from the outer radial surface 75 of the flange 74 to the outer end 62 and has wrench flats 72, six in this example, engageable by a tool for nut-turn purposes, and the flange 74 extends outward in the opposite direction from its outer radial surface 75 and the head 70 to the inner end 60 and radially outward relative to the head 70 from the hole 80 to an outer surface 76. The flange's 74 outer radial surface 75 extends radially outward from the head 70 to the outer surface 76. The flange 754 has a thickness from its outer radial surface 75 to the inner end 60, the inner radial bearing surface of the securing nut 52 that extends radially outward along the flange 74 from the hole 80 to the outer surface 76. The outer end 62, the outer radial bearing surface of the securing nut 52, extends radially outward from the internal thread 82 to the wrench flats 72. The flange 74 has cavities 78. The cavities 78 are spaced apart circumferentially and are cylindrical holes that extend radially outward through the thickness of the flange between the outer radial surface 75 and the inner end 60 from the hole 80 to the outer surface 76. Each cavity 78 is engageable by a tool for nut-turn purposes.

Figure 4:
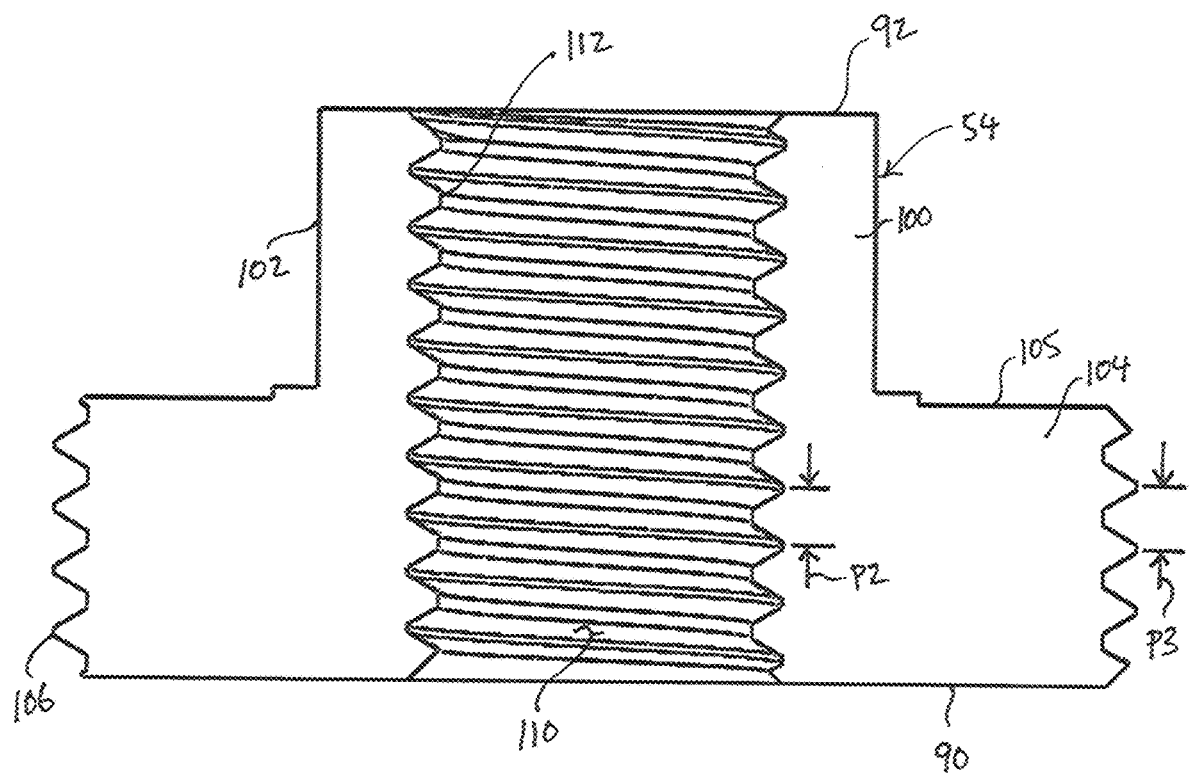
FIG. 4 is a section view taken along line 4-4 of FIG. 1.
Figure 5:
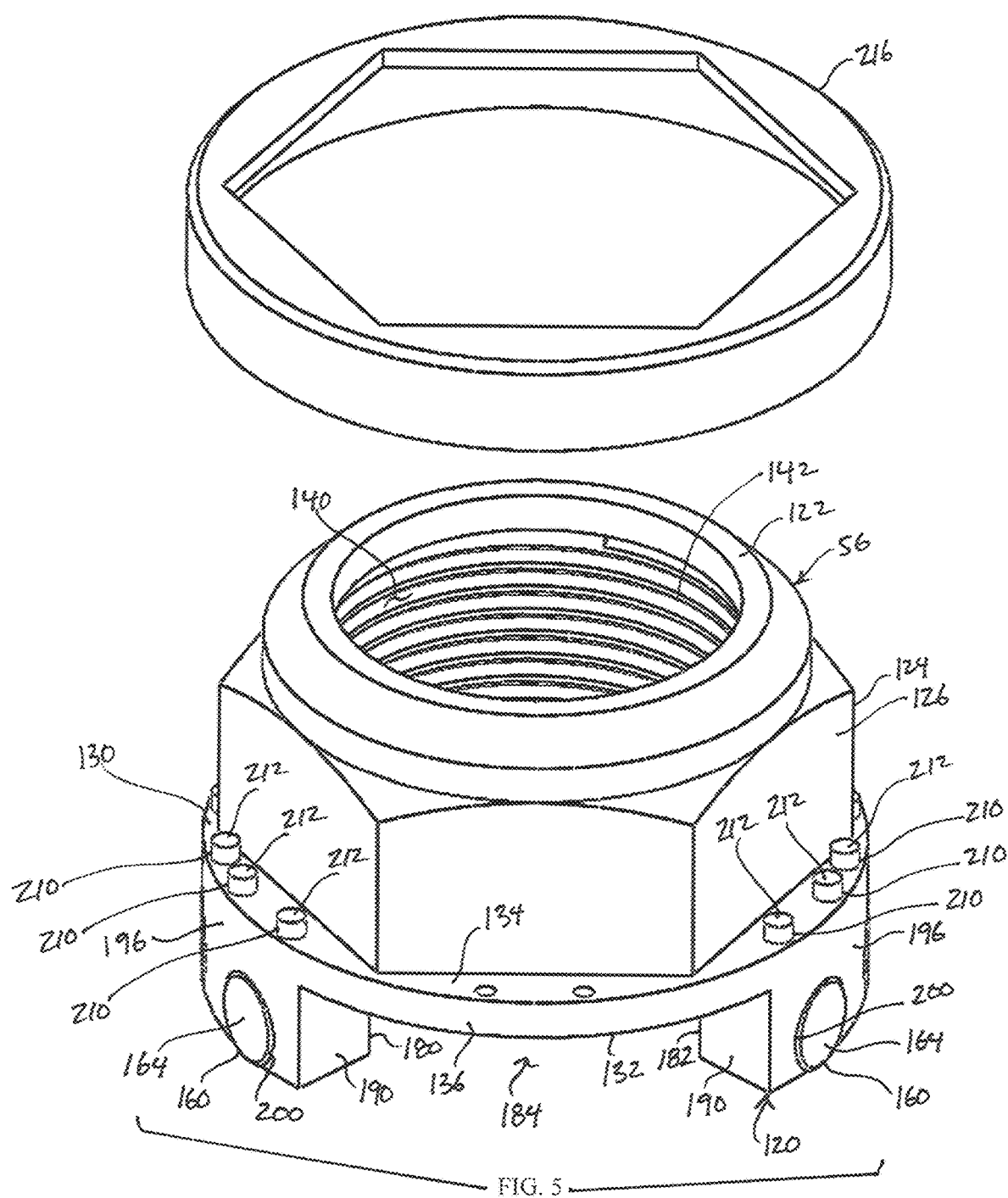
FIG. 5 is a top perspective view of the tensioning nut of FIG. 1 and an annular cap withdrawn from the tensioning nut.
Figure 6:
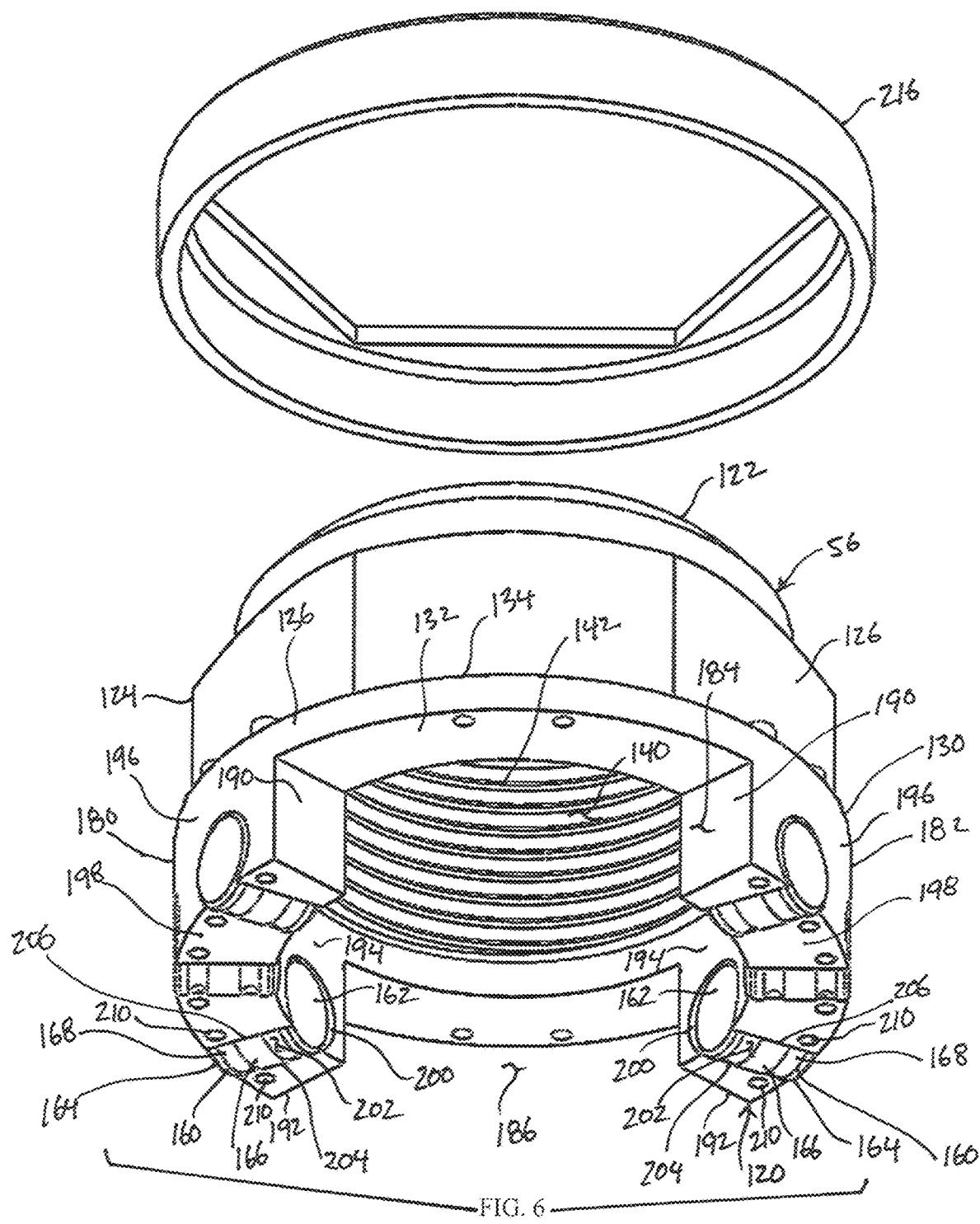
FIG. 6 is a bottom perspective view of the embodiment of FIG. 5.

Referring to FIGS. 1 and 2, relevantly, and FIG. 4, a section view taken along line 4-4 of FIG. 1, the loading nut 54, an annular block or body, includes an inner end 90, an outer end 92, a head 100, a flange 104 having an outer radial surface 105, and a hole 110. The inner end 90 and the outer end 92 are radial bearing surfaces. The inner end 90 is loading nut's 54 inner radial bearing surface. The outer end 92 is the loading nut's 54 outer radial bearing surface. The hole 110 extends through loading nut 54 from inner end 90 to the outer end 92. The inner end 90 and the outer end 92 are each open to the hole 110 configured with an internal thread 112 having a pitch P2, the distance between adjacent peaks or crests of the internal thread 112. The hole 110 is internally threaded by the internal thread 82 that extends between the outer end 92 and the inner end 90 and is configured to thread on a threaded shank. The inner end 90 is tightenable against the securing nut 52 in FIGS. 1 and 2. The head 100 and extends outward from the outer radial surface 105 of the flange 104 to the outer end 92 and has wrench flats 102, six in this example, engageable by a tool for nut-turn purposes, and the flange 104 extends outward in the opposite direction from its outer radial surface 105 and the head 100 to the inner end 90 and radially outward relative to the head 100 from the hole 110 to an external thread 106 having a pitch P3, the distance between adjacent peaks or crests of the external thread 106. The flange's 104 outer radial surface 105 extends radially outward from the head 100 to the external thread 106. The flange 104 has a thickness from its outer radial surface 105 to the inner end 90, the inner radial bearing surface of the loading nut 54 that extends radially outward along the flange 104 from the hole 110 to the external thread 106. The outer end 92, the outer radial bearing surface of the loading nut 52, extends radially outward from the internal thread 112 to the wrench flats 102.

Referring to FIGS. 1, 2, 5, 6, and 7, relevantly, the tensioning nut 56, an annular block or body, includes its surface engaging section 120, an outer end 122, a head 124, a flange 130 having an inner radial surface 130, an outer radial surface 132, and a perimeter edge 134, and a hole 140. The hole 140 extends through the tensioning nut from the surface engaging section 120 to the outer end 122. The surface engaging portion 120 and the outer end 122 are each open to the hole 140 configured with an internal thread 142 having a pitch P4 the distance between adjacent peaks or crests of the internal thread 142. The internal thread 142 is configured to thread on the loading nut's 54 external thread 106. The head 124 extends outward from the outer surface 134 of the flange 130 to the outer end 122 and has wrench flats 126, six in this example, engageable by a tool for nut-turn purposes, and the flange 130 outward in the opposite direction from its outer radial surface 134 and the head 124 to the inner radial surface 132 and radially outward relative to the head 124 from the hole 140 to the perimeter edge 136. The flange's 130 inner radial surface 132 extends radially outward from the hole 140 to the perimeter edge 134. The flange's 130 outer radial surface 134 extends radially outward from the head 124 to the perimeter edge 134. The hole's 140 internal thread 142 extends between the outer end 122 and the flange 130 and the surface engaging portion 120.

The surface engaging section 120 is to engage surfaces and support loads. The surface engaging section 120 extends outward from the inner radial surface 132 of the flange 134 and includes rotating roller bearings 160 carried by blocks 180 and 182. The roller bearings 160 are spaced apart circumferentially along the periphery of the hole 140. The roller bearings 160 are identical cylindrical roller bearings each having opposed ends 162 and 164, a cylindrical outer surface 166 extending between the opposed ends 162 and 164, and a continuous groove 168 formed in the cylindrical outer surface 166. The cylindrical outer surface 166 is the contact surface of each roller bearing 160. The continuous groove 168 is between and parallel to the opposed ends 162 and 164. The blocks 180 and 182 are spaced apart circumferentially along the periphery of the hole 140 and aligned axially on either side of the tensioning nut 56 and the hole 140 forming two axially aligned spaces, openings or gaps 184 and 186 therebetween. The gaps 184 and 186 are tool access points. The blocks 180 and 182 and the gaps 184 and 186 alternate circumferentially and are elongate. The blocks 180 and 182 and how they are configured with their corresponding roller bearings 160 are identical. Accordingly, the details of the block 180 and its roller bearings 160 discussed below apply in every respect to the block 182 and its roller bearings 160. Blocks 180 and 182 share the same reference characters.

Figure 7:
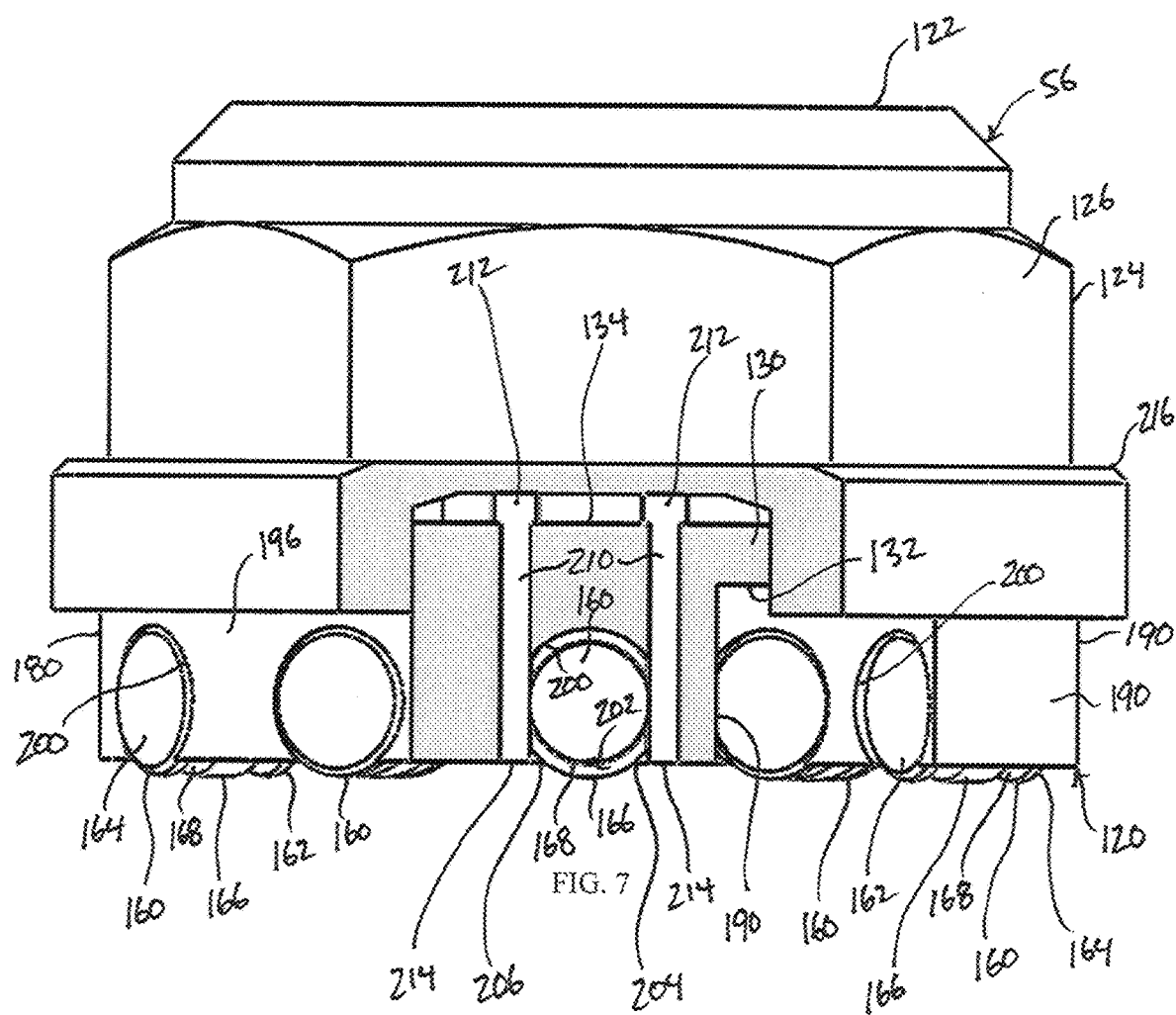
FIG. 7 is a section view taken along line 7-7 of FIG. 1.

The block 180 has opposed ends 190 and 192, an inner surface 194, an outer surface 196, and an underside 198. The block 180 extends outward from the flange's 130 inner surface 132 to the inwardly facing underside 198, curvilinearly along the periphery of the hole 140 from end 190 to end 192, and radially outward from the inward curved inner surface 194 facing the hole 140 to the outward curved outer surface 196. The block 180 has three roller bearings 160 spaced apart circumferentially along the periphery of the hole 140 between the ends 190 and 192. Block 180 can have less or more than three roller bearings 160. Each roller bearing 160 is held rotatably by a semicircular cradle 200 formed in the block 180 through an opening 202 in the underside 198, the opening 202 defined by mutually respective longitudinal edges 204 and 206 extending from the inner surface 194 to the outer surface 196. Each cradle 200 and its opening 202 extend radially outward through the block 180 from the inner surface 194 to the outer surface 196 and are open to the inner surface 194 and the outer surface 196. Each roller bearing 160 is inserted into and extends radially outward through its cradle 200 from its end 162 proximate to the block's 180 inner surface 194 to its end 164 proximate to the block's 180 outer surface 196. Since each cradle 200 is semicircular, each roller bearings 160 cylindrical outer surface 166 from the inner end 162 to the outer end 164 extends outward through the opening 202 of its cradle 200 beyond the block's 180 underside 198, allowing the cylindrical outer surfaces 166 of the roller bearings 160 to roller over and be tightened against a surface. In FIG. 7, a pin 210 extends axially through either side of each cradle 200 and resides in the annular groove 168 of that cradle's 200 roller bearing 160, captively retaining the roller bearings 160 in the respective cradles 200. The annular groove 168 of each roller bearing 160 rotates over its pins 190 when the roller bearing 160 rotates in its cradle 200. Each pin 210 has a head 212 situated atop the flange's 130 outer surface 134 and extends from there through the flange 130 from its outer surface 134 and into the block 180 through the side of its corresponding cradle 200 to an end 214 anchored in the block 180 proximate to the block's 180 underside 198. The blocks 180 and 182 and their respective roller bearings 160 axially aligned on either side of the tensioning nut 56 and the hole 140 form the two axially aligned gaps 184 and 186, the gap 184 between the ends 190 of the respective blocks 180 and 182 and the gap 186 between the ends 192 of the respective blocks 180 and 182. An annular flange 200 in FIGS. 5 and 6 fits over and encircles the head 124 in FIGS. 1 and 2 and resides atop the heads 212 of the various pins 210 in FIG. 7, covering them and weighing the pins 210 down.

Figure 8:
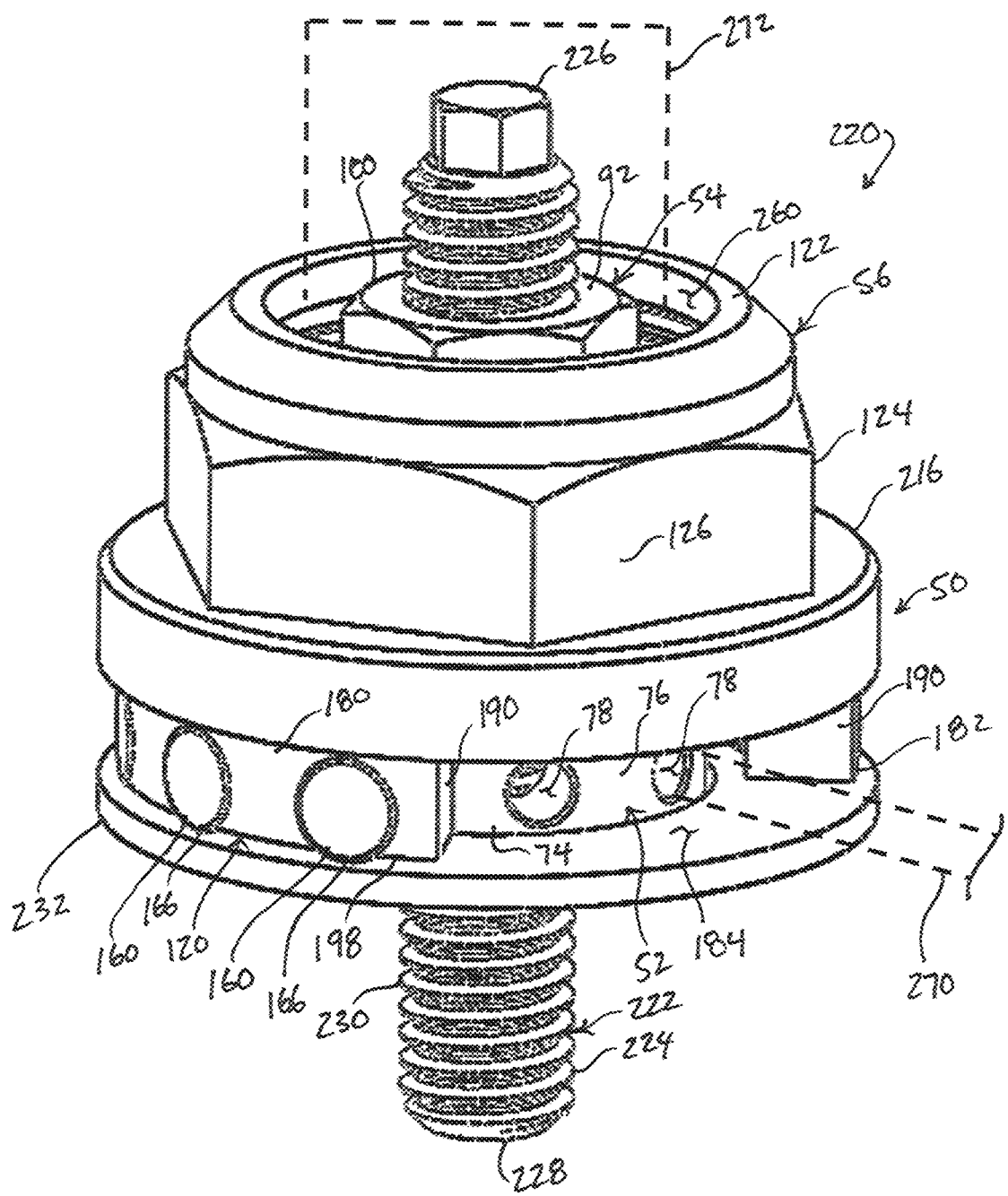
FIG. 8 is a top perspective view of a fastener assembly constructed and arranged in accordance with the invention.
Figure 9:
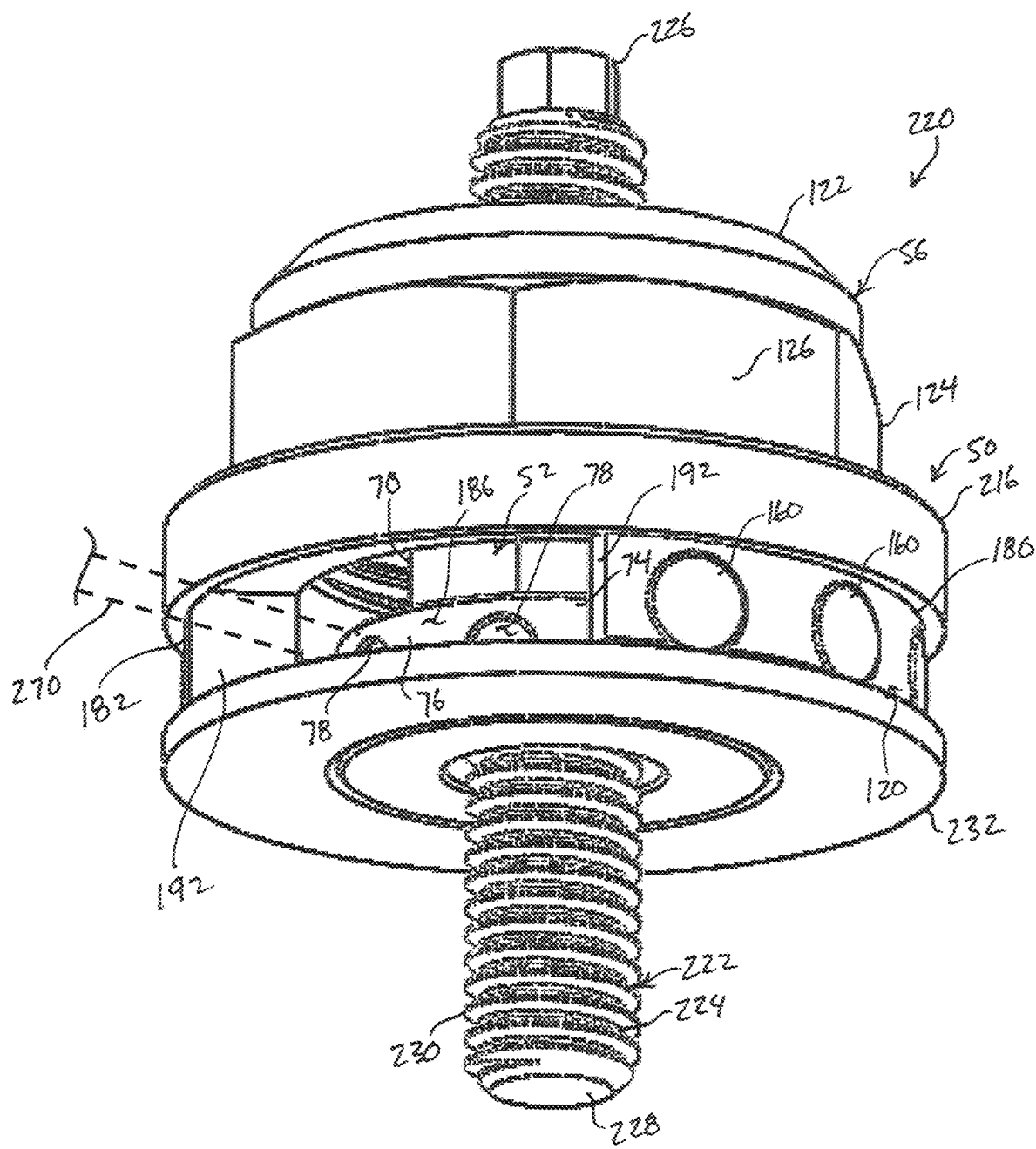
FIG. 9 is a bottom perspective view of the embodiment of FIG. 8.
Figure 10:
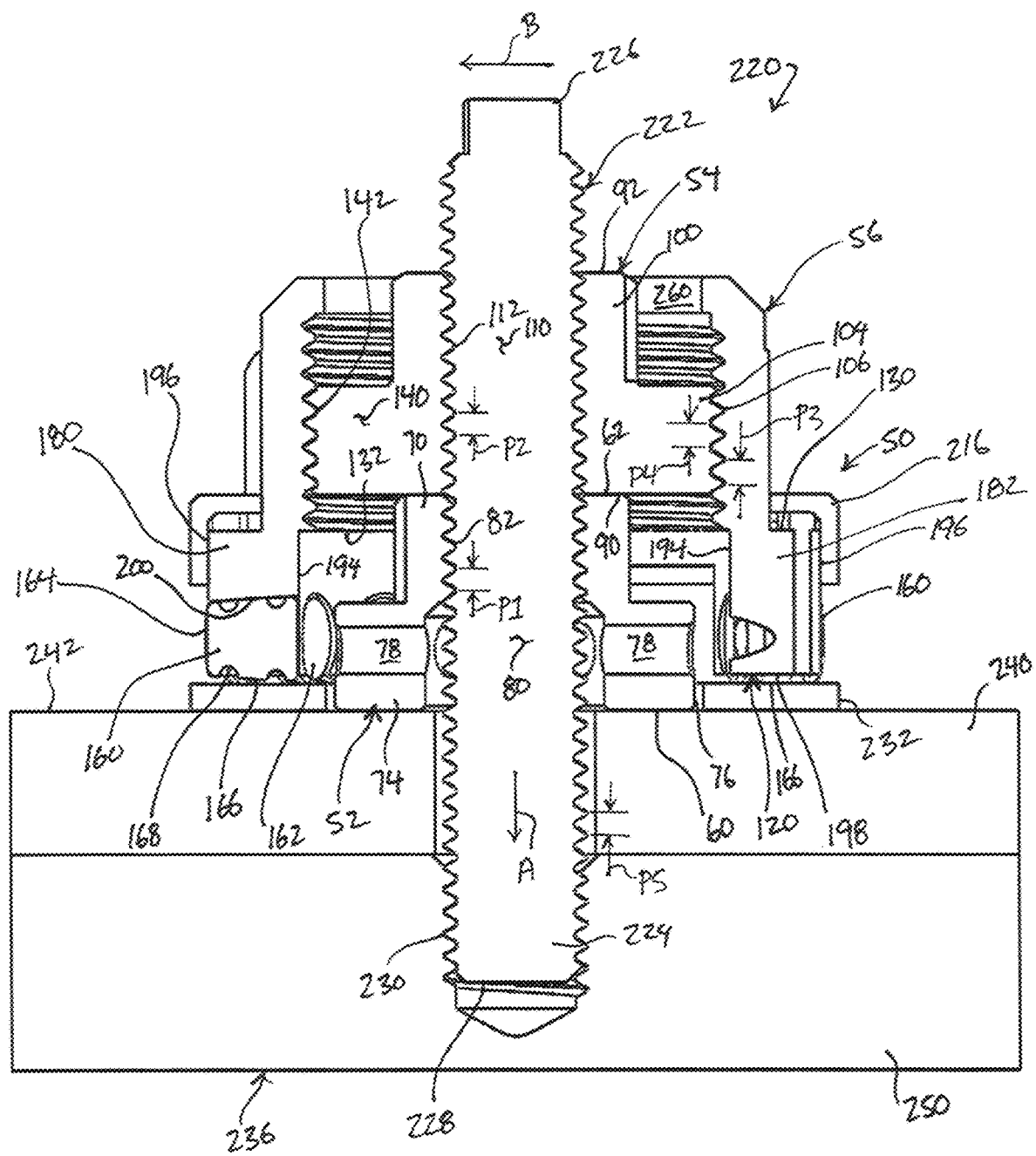
FIG. 10 is a central longitudinal section view of the fastener assembly of FIG. 8 shown in use.

FIGS. 8 and 9 illustrate a fastener assembly 220 useful in forming bolted joints, such as the bolted joint in FIG. 10, the fastener assembly 220 includes the bolt tensioner assembly 50 and a corresponding bolt 222. In this embodiment, the bolt 220 is a headless bolt, a longitudinally straight cylindrical shank 224 having a first or proximal end 226, a second or distal end 228, and an external thread 230 extending between the first end 226 and the second end 228. The external thread 230 has a pitch P5, the distance between adjacent peaks or crests of the external thread 230. The shank 224 is exemplary of a threaded shank. The pitch P1 of the securing bolt's 52 internal thread 82, the pitch P2 of the loading bolt's 54 internal thread 112, and the pitch P5 of the shank's 224 external thread 230 are the same. The pitch P3 of the of the loading bolt's 54 external thread 106 and the pitch P4 of the tensioning bolt's 56 internal thread 142 are the same. The securing nut 52 and the loading nut 56 are threaded on the shank's 224 external thread 230, the securing nut 52 between the loading nut 54 and the second end 228 of the shank 224 and the loading nut 54 between the securing nut 52 and the first end 226 of the shank 224. The outer end 62 of the securing nut 52 and the inner end 90 of the loading nut 54 are tightenable against each other. The tensioning nut 56 is threaded on the loading nut 54 with the surface engaging section 120 spaced radially outboard of the securing nut 52, the roller bearings 160 extending outward beyond the undersides 198 of the respective blocks 180 and 182 to their cylindrical outer surfaces 166 to contact a surface to support loads, such as the underlying washer 232 over the securing nut 52 and the shank 224. The washer 232 is a standard washer in the nature of a flat thin ring used in joints or assemblies to ensure tightness.

FIG. 10 shows a bolted joint 236, including a first or upper member 240 and a second or lower member 250 secured together by the assembled fastener assembly 220. In this example, the upper and lower members 240 and 250 are plates of metal. The bolt 222 extends inward through the upper member 240 to its second end 228 in the lower member 250 and threadedly engages the lower member 250, anchoring the bolt 222 to the second member 250. The bolt 222 extends outward from the outer surface 242 of the upper member 250 to the first end 226. A worker can quickly and easily assemble the bolt 222 and the bolt tensioner assembly 50 by hand by threading the securing nut 52 and the loading nut 54 on the shank 224, threading the tensioning nut 56 on the loading nut 52, winding down the tensioning nut 56 to preload the bolt 222, winding down the securing nut 52 to apply more load to the bolt 222, clamping the upper member 240 between the lower member 250 and the securing bolt 52, and winding down the loading nut 54 against the securing nut 52 locking together the loading nut 54 and the securing nut 52 to prevent the securing nut 52 from slacking back, forming the bolted joint 236, described in detail below.

The worker installs the securing nut 52 by hand, by applying the securing nut 52 inward over the first end 226 of the shank 224 in the direction of arrow A, inserting the first end 226 of the bolt 222 into the securing nut's 52 hole 80 through the inner end 60 so the external thread 230 adjacent to the first end 226 encounters the internal thread 82 that corresponds to and is to thread rotationally over and on the shank's 224 external thread 230. He threads the internal thread 82 over and on the external thread 230 to wind the securing nut 52 down over the shank 224 in the direction of arrow A toward the second end 228 to between the shank's 224 first and second ends 226 and 228 by rotating the securing nut 52 in the clockwise direction of arrow B when viewed from the point of view facing the first end 226 on the central longitudinal axis of shank 224 with the securing nut 52 extending outward to its outer end 62 from its inner end 60 tightened in direct contact against the outer surface 242 of the upper member 240, initially loading or otherwise tensioning the shank 224 between its second end 228 anchored to the lower member 250 and the securing nut 52, clamping the upper member 240 between the lower member 250 and the securing bolt 52. The worker winds the securing nut 52 down to tighten its inner end 60 against the outer surface 242 of the upper member 240 by gripping the securing nut's 52 head 70 with a wrench and forcibly twisting the securing nut 52 in the direction of arrow B using the wrench, initially tensioning the shank 224. The washer 232 set atop the upper surface 242 of the upper member 240 encircles and is radially outboard of the outer surface 76 of the securing nut 52.

The worker installs the loading nut 54 by hand, by applying the loading nut 54 inward over the first end 226 of the shank 224 in the direction of arrow A, inserting the first end 226 of the bolt 222 into the loading nut's 54 hole 110 through the inner end 90 so the external thread 230 adjacent to the first end 226 encounters the internal thread 112 that corresponds to and is thread rotationally over and on the shank's 224 external thread 230. He threads the internal thread 112 over and on the external thread 230 to wind the loading nut 54 down over the shank 224 in the direction of arrow A to between the securing nut 52 and the shank's 224 first end 226 by rotating the loading nut 54 in the clockwise direction of arrow B with the loading nut 54 extending outward to its outer end 92 from its inner end 90 tightened in direct contact against the outer end 62 of the securing nut 52. The worker winds the loading nut 54 down to tighten its inner end 90 against the securing nut's 52 outer end 62 by gripping the loading nut's 54 head 100 with a wrench and forcibly twisting the loading nut 54 in the direction of arrow B using the wrench, locking the loading nut 54 and the securing nut 52 together, preventing the securing nut 52 from slacking back.

The worker installs the tensioning nut 56 by hand, by applying the tensioning nut 52 inward over the first end 226 of the shank 224 in the direction of arrow A, inserting the first end 226 of the bolt 222 followed by the outer end 92 of the loading nut 54 into the tensioning nut's 56 hole 140 through surface engaging section 120 so the loading nut's 54 external thread 106 encounters the internal thread 142 that corresponds to and is to thread rotationally over and on the loading nut's 54 external thread 106. He threads the internal thread 142 over and on the external thread 106 to wind the tensioning nut 56 down in the direction of arrow A over the shank 224, the loading nut 54, and the securing nut 52 to the tensioning nut's 56 operative or installed position in FIG. 10 by rotating the tensioning nut 56 in the clockwise direction of arrow B. In the tensioning nut's 56 installed position, its outer end 122 is above the outer radial surface 105 of the loading nut's 54 flange 104 and disposed radially outward of the loading nut's 54 head 100. The outer section of the tensioning nut 56 extending outward from the outer radial surface 105 of the loading nut's 56 flange 104 to the outer end 122 forms an outwardly open annular space 260 around the loading nut's 56 head 100 in FIGS. 8 and 10. The surface engaging portion 120 is under the lower end 90 of the loading nut 54 and disposed radially outboard of the outer surface 76 of the securing nut's 52 flange 74, the alternating blocks 180 and 182 and gaps 184 and 186 spaced radially outboard of the outer surface 76 of the securing nut 52 and extending circumferentially around the outer surface 76 of the securing nut 52 with the roller bearings 160 in direct contact against the washer 232 situated atop the outer surface 242 of the upper member 240. The axially aligned blocks 180 and 182 and their respective roller bearings 160 are on either side of the securing nut 52 and the axially gaps 184 and 186 on either side of the securing nut 52 between the blocks 180 and 182. The roller bearings 160 are spaced radially outboard of the outer surface 176 of the securing nut 52 and are spaced apart circumferentially along the outer surface 76 of the securing nut 52, their cylindrical outer surfaces 166 defining circumferentially spaced apart contact points radially outboard of the outer surface 76 of the securing nut 52 and in direct contact against the washer 232.

The worker tensions the bolt 222 with the tensioning nut 56 by winding the tensioning nut 56 down to tighten the cylindrical outer surfaces 166 of the bearings 160 of the surface engaging section 120 against the washer 232 by gripping the tensioning nut's 56 head 124 with a wrench and forcibly twisting the tensioning nut 56 in the direction of arrow B using the wrench, further tensioning the bolt's 222 shank 224 between the loading nut 54 and the shank's 224 second end 228 anchored to the lower member 250, clamping the upper member 240 between the lower member 250 and the surface engaging section 120 of the tensioning bolt 56. The worker forcibly rotates the tensioning bolt 56 with sufficient force required to load the bolt's shank 224 to a desired tension. The cylindrical outer surfaces 166 of the roller bearings 160 roll over the washer 232 in response to rotation of the tensioning bolt 56 about the shank 224, limiting friction between the surface engaging section 120 of the tensioning nut 56 and the washer 232. At the same time, the roller bearings 160 support axial loads at their cylindrical outer surfaces 166.

Having tensioned the bolt's 224 shank 222 using the tensioning bolt 56, the worker again winds the securing nut 52 down to tighten its inner end 60 against the outer surface 242 of the upper member 240 by forcibly twisting the securing nut 52 in the direction of arrow B. The worker forcibly rotates the securing bolt 52 with sufficient force required to secure the bolt's 222 shank 224 to the desired tension from the preload supplied by the tensioning bolt 56. The worker then winds the loading nut 54 down to tighten its inner end 90 against the securing nut's 52 outer end 62 by forcibly twisting the loading nut 54 in the direction of arrow B, locking the loading nut 54 and the securing nut 52 together, preventing the securing nut 52 from slacking back. This completes the formation of the bolted joint 236, clamping the upper member 250 between the shank's 224 second end 228 anchored to the lower member 250 and the securing nut 52 against the outer surface 242 of the upper member 240.

The securing nut 52 of the assembled fastener assembly 220 is engageable by a tool, denoted generally at 270 in FIGS. 8 and 9, inserted through the tensioning nut for rotating the securing nut 52 about the shank 224 relative to the loading nut 54 and the tensioning nut 56, allowing the worker wind and unwind the securing nut 52. The gaps 184 and 186 in FIGS. 8 and 9, respectively, are tool access points open to the outer surface 76 of either side of the securing nut 52 and the cavities 78 extending therein. This allows a user to selectively insert the tool 270 through the gap 184 access point in FIG. 8 to engage the securing nut 52 by inserting the tool 270 into one of the cavities 78 open the gap 184 or through the gap 186 access point in FIG. 9 to engage the securing nut 52 by inserting the tool 270 into one of the cavities 78 open the gap 186. The worker can insert the tool 270 through one of the gaps 184 and 186 and into one of the cavities 78, forcibly rotate the securing nut 52 in the direction of arrow B using the tool 270 to wind down the securing nut 52 in the direction of arrow A, withdraw the tool 270 from the cavity 78, and repeat the tightening with the next available cavity 78, whether one open to the gap 184 or one open to the other gap 186. The gaps 184 and 186 provide selective access to the cavities 78 used by the tool to twist the securing nut 52. The tool 270 can be a screwdriver, a stiff rod of metal, or the like.

The loading nut 54 of the assembled fastener assembly 220 is engageable by a tool, denoted generally at 272 in FIG. 8, inserted through the tensioning nut 56 for rotating the loading nut 54 about the shank 224 relative to the securing nut 52 and the tensioning nut 56 as needed after winding down the securing nut 52 to wind down the loading nut 54 in the direction of arrow A to lock its inner surface 90 against the securing nut's 52 outer surface 62, preventing the securing nut 52 from slacking back. The loading nut 54 of the assembled fastener assembly 220 is engageable by the tool 272, pliers, a wrench, a socket of a socket wrench, or the like, through the tensioning nut's 56 outer end 122. The worker can selectively insert the tool 272 into the annular space 260 and over the loading nut's 54 head 100 through the tensioning nut's 56 outer end 122 open to the annular space 260 and the head 100, engage the head 100 by gripping it with the tool 272, forcibly rotate the loading nut 54 in the direction of arrow B using the tool 272 and, when finished, withdraw the tool 272 from the annular space 260 and the head 100.

Loading the bolt's 222 shank 224 to a desired tension or preload between the loading nut 54 and the shank's 224 second end 228 by winding down the tensioning nut 56 working between the loading nut 54 and the shank's 224 second end 228, setting the shank's 224 load to a precise or desired tension between the securing nut 52 and the shank's 224 second end 228 by winding down the securing nut 52, and winding down the locking nut 54 against the securing nut 52 to prevent the securing nut from slacking back forms a highly aggressive bolted joint 236, in which the assembled fastener assembly 220 is surprisingly strong and aggressive and resistant to axial failure, shear failure, and loosening in response to vibrational and prevailing torsional forces. As a matter of example, a worker can wind down the tensioning bolt 56 to tension the shank 224 between the loading nut 54 and the shank's 224 second end 228 to 45-75% of the shank's 224 load rate, and then wind down the securing nut 52 to precisely tension the shank 224 between the securing nut 52 and the shank's 224 second end 228, such as to 85-95% of the shank's 224 load rate, before winding down the loading nut 54 against the securing nut 52. At this stage, the worker may, if desired, remove the tensioning nut 56 simply by reversing the process of installing it by simply unwinding off the loading nut 54 and withdraw the washer 232, if desired. In a particular embodiment, there is a magnetic attraction between the tensioning nut 56 and the washer 232, magnetically coupling the tensioning nut 56 to the washer 232 so the washer 232 magnetically coupled to the tensioning nut 56 would accompany the tensioning nut 56 as it is unwound off the loading nut 54 without having to remove the washer 232 separately. The washer 232 can be a standard magnetic washer magnetically coupled to the roller bearings 160 made of steel or other suitable ferromagnetic metal. Alternatively, the washer 232 can be made of steel or other suitable ferromagnetic metal and the roller bearings made of magnetic material. Either embodiment facilitates magnetically coupling the washer 232 to the tensioning nut 56 when the roller bearings 160 are in direct contact against the washer 232. The worker can remove the securing nut 52 and the loading nut 54 to release the bolted joint 236 by reversing the process of installing them, by simply unwinding winding them off the shank 224, the loading nut 54 followed by the securing nut 52. Although the washer 232 is disposed between the roller bearings 160 of the tensioning nut's 56 surface engaging section 120 and the outer surface 242 of the upper member 240 in the bolted joint 236, it can be omitted so the tensioning nut's 56 surface engaging section 120 directly engages the outer surface 242 instead of the washer 232. If desired, a washer can be applied between the securing nut's 52 inner surface 60 and the outer surface 242 of the lower member 250.

The bolt 220 discussed above is a headless bolt that extends through the upper member 240 and threadably engages the lower member 250, anchoring the bolt 220 to the lower member 250. Instead of a headless bolt, the bolt used in the bolted joint can have a head. In this example, the bolt would extend through the upper and lower members 240 and 250 to its head applied to the underside of the lower member 240 or recessed in a counterbore formed in the lower member 250 through its underside, anchoring the bolt to the lower member.

The tensioning nut 56 has two blocks 180 and 182 each having three roller bearings 160. As described above, each block 180 and 182 can have less or more than three roller bearings. The tensioning nut 56 can also have more than two roller bearing blocks to form more than two gaps as desired depending on given requirements.

As described above, pitches P1, P2, and P3 are the same, and pitches P3 and P4 are the same. In a particular embodiment, pitches P1, P2, P3, P4, and P5 are the same. In another embodiment, pitches P3 and P4 are finer than pitches P1, P2, and P3, in which each of the identical pitches P3 and P4 has a lower thread pitch compared to each of the identical pitches P1, P2, and P5. This provides precise adjustments between the tensioning bolt 56 and the shank 224 and less torque required to develop bolt 222 preloads before winding down the securing nut 52, tightening its inner end 60 against the upper member's 240 outer surface 242 to clamp the upper member 240 between the lower member 250 and the securing bolt 52 and winding down the loading nut 54 against the securing nut 52 to lock them together. In a specific embodiment, the pitches P3 and P4 are each about one to three times smaller than each of the pitches P1, P2, and P5.

The present invention is described above with reference to illustrative embodiments. Those skilled in the art will recognize that changes and modifications may be made in the described embodiments without departing from the nature and scope of the present invention. Various changes and modifications to the embodiments herein chosen for purposes of illustration will readily occur to those skilled in the art. To the extent that such modifications and variations do not depart from the invention, they are intended to be included within the scope thereof.

Having fully described the invention in such clear and concise terms as to enable those skilled in the art to understand and practice the same, the invention claimed is:

1. A fastener assembly, comprising:
   a securing nut and a loading nut threaded on a threaded shank having a first end and a second end, the securing nut between the loading nut and the second end, the loading nut between the securing nut and the first end, and the securing nut and the loading nut tightenable against each other;

a tensioning nut including a surface engaging section, the tensioning nut threaded on the loading nut with the surface engaging section spaced radially outboard of the securing nut; and the surface engaging section comprising blocks configured with rotating roller bearings extending outward beyond the blocks toward the second end to support loads.

2. The fastener assembly according to claim 1, wherein the surface engaging section comprises rotating roller bearings projecting outward toward the second end to support loads.

3. The fastener assembly according to claim 2, wherein the rotating roller bearings are spaced apart circumferentially.

4. The fastener assembly according to claim 1, wherein the securing nut is engageable by a tool inserted through the tensioning nut for rotating the securing nut about the threaded shank.

5. The fastener assembly according to claim 1, wherein the loading nut is engageable by a tool inserted through the tensioning nut for rotating the loading nut about the threaded shank.

6. The fastener assembly according to claim 1, the securing nut comprising:

an inner end;

an outer end tightenable against the loading nut; and a hole extending through the securing nut from the inner end to the outer end opposing the loading nut, the hole comprising an internal thread threaded on the threaded shank.

7. The fastener assembly according to claim 6, wherein the securing nut is engageable by a tool inserted through the tensioning nut for rotating the securing nut about the threaded shank.

8. The fastener assembly according to claim 7, wherein the tensioning nut is configured with a gap that is open to the securing nut, the securing nut engageable by the tool inserted through the gap.

9. The fastener according to claim 8, wherein the securing nut has a cavity that is open outward to the gap, the securing nut engageable by the tool by inserting it through the gap and into the cavity.

10. The fastener assembly according to claim 1, the loading nut comprising:

an inner end tightenable against the securing nut;

an outer end;

a hole extending through the loading nut from inner end opposing the securing nut to the outer end, the hole comprising an internal thread threaded on the threaded shank;

a head;

an external thread;

the head between the external thread and the outer end;

the external thread between the head and the inner end;

the tensioning nut threaded on the external thread; and the outer end of the tensioning nut open to the head, the head engageable by a tool inserted through the outer end of the tensioning nut for rotating the loading nut about the threaded shank.

11. The fastener assembly according to claim 1, the tensioning nut comprising:

an outer end;

a hole extending through the tensioning nut from the outer end to the surface engaging section, the hole comprising an internal thread threaded on the loading nut; and a head between the outer end and the surface engaging section.

12. The fastener assembly according to claim 1, wherein the rotating roller bearings are spaced apart circumferentially.

13. The fastener assembly according to claim 1, wherein the blocks are spaced apart circumferentially.

14. The fastener assembly according to claim 13, further comprising a gap between the blocks that is open to the securing nut, the securing nut engageable by the tool inserted through the gap.

15. The fastener according to claim 14, wherein the securing nut has a cavity that is open outward to the gap, the securing nut engageable by the tool by inserting it through the gap and into the cavity.

16. The fastener assembly according to claim 1, further comprising a washer coupled magnetically to the roller bearings.

* * * * *